A. R. HOFFMANN.
FEEDING APPARATUS.
APPLICATION FILED JULY 1, 1907.
936,129.
Patented Oct. 5, 1909.
2 SHEETS—SHEET 1.
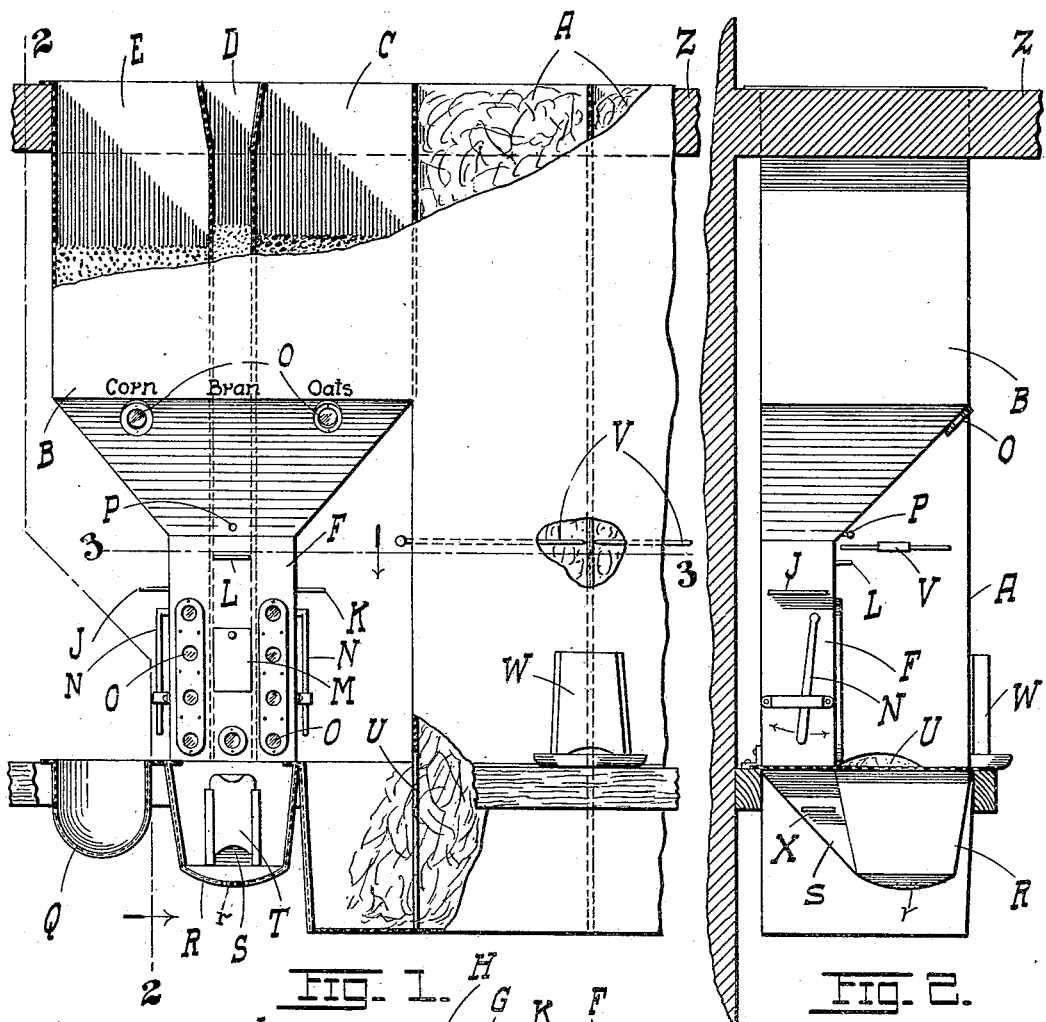
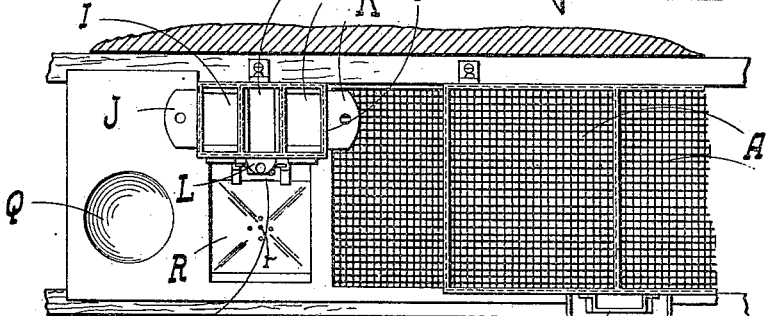
WITNESSES:
INVENTOR.
August R. Hoffmann
BY
John H. Kinealy
ATTORNEY.

A. R. HOFFMANN.
FEEDING APPARATUS.
APPLICATION FILED JULY 1, 1907.
936,129.
Patented Oct. 5, 1909.
2 SHEETS—SHEET 2.
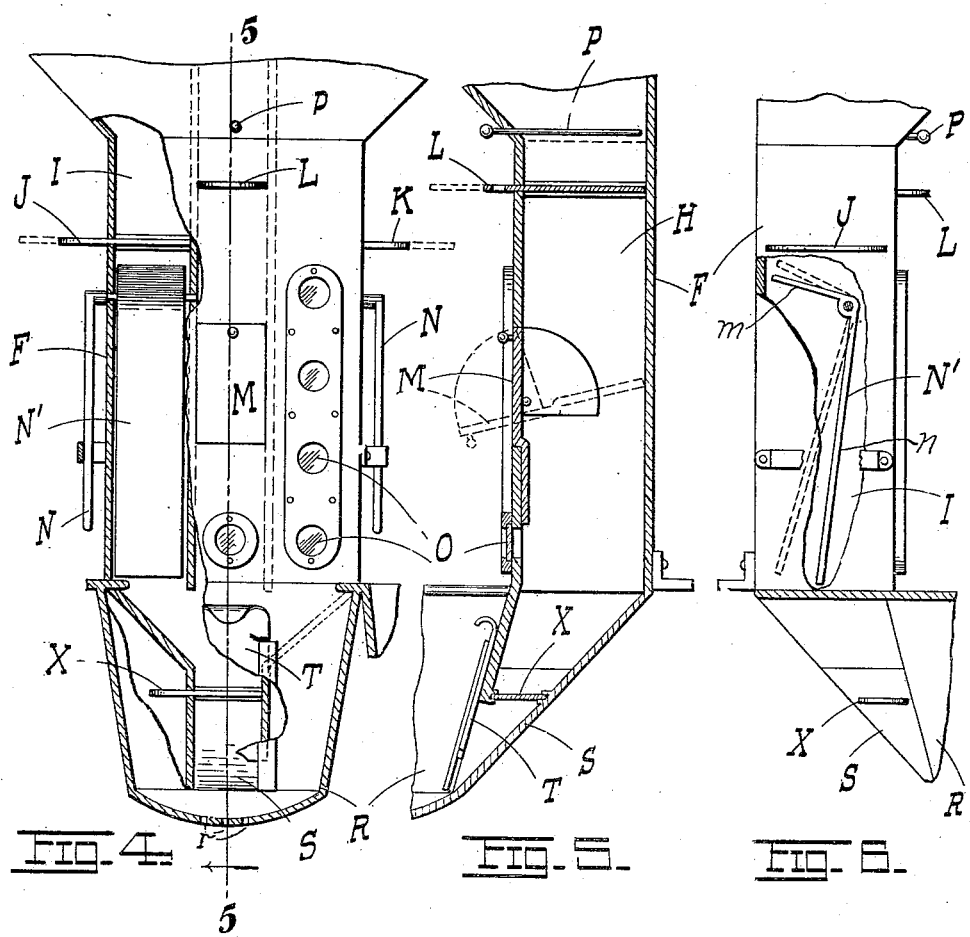
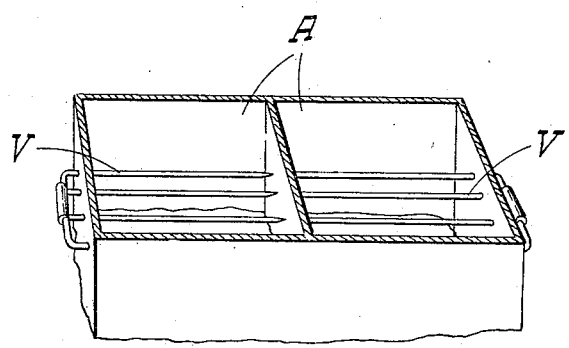
WITNESSES:
INVENTOR.
August R. Hoffmann
BY
John H. Kinealy
ATTORNEY.

UNITED STATES PATENT OFFICE.

AUGUST R. HOFFMANN, OF ST. LOUIS, MISSOURI.

FEEDING APPARATUS.

936,129.  Specification of Letters Patent.  Patented Oct. 5, 1909.

Application filed July 1, 1907. Serial No. 381,799.

*To all whom it may concern:*

Be it known that I, AUGUST R. HOFFMANN, a citizen of the United States, residing in the city of St. Louis, State of Missouri, have invented a new and useful Improvement in Feeding Apparatus, of which the following is a full, clear, and exact specification, reference being had to the accompanying drawings, which form a part thereof.

My invention relates to that type of feeding apparatus in which corn, oats, and other food-stuff given to horses or other animals are allowed to flow in measured quantities from bins in proportion to the demands of the animal being supplied with food.

The object of my invention is to make it possible to supply a measured quantity of food to the animal; and a further object of my invention is to make it possible to supply in measured quantities a mixture consisting of different foods in any desired proportion; and a still further object of my invention is to prevent waste of food by regulating the supply to suit the demands of the animal being fed.

My invention is fully shown in the accompanying drawings where similar letters are used to designate similar parts.

Figure 1 is a front view of the apparatus with certain parts broken away to more fully show the interior arrangement. Fig. 2 is a side view and section along the line 2—2 of Fig. 1. Fig. 3 is a horizontal sectional view of the apparatus along the lines 3—3 of Fig. 1. Figs. 4, 5, 6, and 7 are views showing details of constructions of different parts of the apparatus.

Referring to the figures, A is a bin for hay or similar food.

B is a structure divided into bins for different grains. Thus the bin C is intended for oats, D for bran, and E for shelled corn. The bin A and the bins C, D, and E are open at their upper ends onto a floor above the room in which the feeding apparatus is installed, so that the foods of different kinds may be easily and conveniently put into the various bins.

F is a box containing passages leading from the bins C, D, and E to the space S which is in communication with the eating trough R. The arrangement of the various parts of F is shown in detail in Figs. 4, 5, and 6. Fig. 4 is a front view with a part of the front broken away so as to show the interior of the passage I leading from the bin E to the space S. Fig. 5 is a section along the line 5—5 of Fig. 4 showing the passage H leading from the bin D to the space S. Fig. 6 is a side view of Fig. 4 with part of the side of the passage I broken away so as to show the interior.

J, K, and L are slides by which the flow of food through the passages leading from the bins E, C, and D is controlled. When these slides are pushed in, the passages are closed, and no food can pass down from the bins, but when the slides are pulled out the passages are open and food falls from the bins into the space S.

M is a door pivoted to the bin approximately at its vertical center with the portion below the pivot extending within the bin through which a measured quantity of bran mash or medicine can be introduced below the gate L into the passageway leading from the bin D. M is so constructed that when it is opened a shelf-like projection rises into place in the passage leading from the bin D as shown in dotted lines in Fig. 5. The object of this shelf is to present a place on which a measured quantity of any food or medicine may be placed. When the door M is closed this shelf drops down and allows whatever may have been placed upon it to fall into the space S leading to the eating trough R.

O are peep-holes or windows covered with glass which enables one to look into the bins and the passages leading from them. They serve to determine whether or not the bins have food in them, and whether or not it falls down the passages when the slides J, K, and L are opened.

N are handles by means of which the positions of adjustable partitions N' are changed in the passages leading from the bins C and E. The construction and arrangement of this partition N' is shown in detail for the passage I leading from the bin E in Figs. 4 and 6. It will be noticed that this partition is hung on a rod passing through its upper part and has vertical and horizontal legs. The vertical leg $n$ can be adjusted so as to be parallel to the front of the passage or so as to make an angle with it. The horizontal leg $m$ is made so that when the slide J is opened corn dropping from the bin E strikes this horizontal leg and is made to fall between the front of the passage I and the vertical leg of the adjustable partition N'. The rod on which the partition N' swings is placed well toward the front of the passage I, and by means of the handle N, the position of the partition N' may be so adjusted that the space between the front of the passage I and the partition N' may be made to vary between wide limits.

P is a stirring rod projecting into the bin D, which is for the purpose of stirring up and loosening the bran in this bin. This rod is necessary because it is found that a substance such as bran is likely to pack and when the slide L is opened it will not then fall down as it should. This rod, however, enables it to be loosened and made to fall even when it becomes packed.

Q is a drinking bucket set beside the eating trough R.

S is a space into which are led the passages from the bins C, D, and E, and which is provided with a slide X by which communication with these passages may be opened or closed.

T is a slide by which the opening between the space S and the eating trough R may be adjusted.

U is an opening through which the animal has access to the hay in the bin A.

V are forked slides made of iron rods by which the passage of hay from the upper part of the bin A to the opening U may be controlled. These slides are shown in detail in Fig. 7.

W is a salt-box attached to the front of the feeding apparatus, and Z are supports to which the bins are attached.

The bin A is preferably provided with a bottom made of wire screen so as to allow the circulation of air upward through the hay in the bin. The eating trough R has perforations r as indicated in Fig. 3 so that moisture from slobbering of the animal can not accumulate so as to spoil the food.

The apparatus is placed at the head of the stall which the animal is to occupy. Hay is put in the bin A, and grain of different kinds in the bins C and E, and bran in the bin D. The forked slide V is pulled out and hay drops to the bottom of the bin A where the animal can get at it through the opening U. The slide V is then pushed in and prevents any hay from being taken out through the opening U except that which is below this slide V. The hay should be loose so that it will fall easily, and as the bottom of the bin is perforated, air can circulate upward through the bin and the hay in it, thus keeping the hay always in good condition. If it be desired to give the animal two quarts of shelled corn the partition N' is adjusted so that the space between it and the front of the passage I, including all the space from the slide X up to the slide J, will hold two quarts of corn. Then the slide X is pushed in so as to close communication between the passage I and the space S. The slide J is then opened and corn falls down from the bin E, and fills the space between the partition N' and the front of the passage and also the unoccupied space above the slide X. When corn ceases to fall down, the slide J is pushed in and there is then two quarts contained in the passage I between the slides J and X. The slide X is then opened and corn falls down into the space S and out through the opening under the slide T into the eating trough R. The slide T is adjusted according to the nature of the grain so that the grain will not run too easily into the eating trough. Usually when grain has run into the eating trough so that the grain is level with the bottom of the slide T the grain will cease to flow under this slide into the trough. The animal eating the grain removes what is in the trough and by his tongue and lips takes some of the grain through the opening under the slide T; so that as long as the animal continues to eat, the measured quantity of grain below the slide J falls down and passes into the trough R until it has all been eaten. If the animal ceases to eat before all of the measured quantity of grain has been consumed, the unconsumed part remains in the space S and the lower part of the passage I. If it is desired to feed a mixture of say corn and oats, a measured quantity of corn is taken from the bin E and a measured quantity of oats from the bin C and allowed to fall into the passages leading to the space S. This is done by manipulating the slides K, J, and X in the manner already described. This mixture of corn and oats passes down into the space S and out into the eating trough through the opening below the slide T. By opening and closing the slide L a quantity of bran may be put in with the mixture of corn and oats. The mixture of the three will come together where the passages leading from the bins join in the space immediately above the slide X, and when this slide is opened the mixture will pass into the space S and from there into the eating trough R. Any grain may be fed continuously from its bin by keeping open the slide controlling the flow of that grain from its bin to the passage leading to the space S. Thus, if it is desired to let the animal eat corn as long as he chooses, the slides X and J are kept open and the slides L and K are kept closed, and as long as these slides remain open corn will pass downward from the bin E into the eating trough R.

The slide T may be adjusted so that the grain may pass either quickly or slowly from the space S into the eating trough. If the slide is raised so that the opening below it is comparatively large, the grain will pass into the eating trough quite rapidly; but if the slide is lowered so that the opening under it is comparatively small, the grain will pass into the eating trough slowly, and may even require work on the part of the animal to get the grain from the space S into the eating trough. This insures of course that the animal must eat slowly and take time for his meal. Retarding the passage of grain into the eating trough also prevents the animal from leaving in the trough grain that he has mouthed or slobbered over, thus securing economy in the consumption of grain; and since the bottom of the eating trough is perforated, saliva and moisture cannot accumulate in it.

The drinking-bucket is not essential to the apparatus, but it is convenient to have it so that the animal may have water while eating. The salt-box W is also of benefit to the animal, but is not essential to the working of the apparatus.

Sometimes it is necessary or desirable to give the animal a bran mash or a dose of medicine, and in that case it is introduced into the passage H through the door M.

The apparatus may be made of any suitable material, and the sizes of the bins, passages, and the eating troughs may be varied to suit the requirements of different conditions without in any way changing the form of my invention.

What I claim as new and desire to secure by Letters Patent is:

In a feeding apparatus, the combination of an eating trough having a perforated bottom, a bin for grain having a passage leading into the eating trough, slides in said passage by means of which a measured quantity of grain may be drawn from the bin, an adjustable partition pivotally swung on a rod in said passage and having horizontal and vertical legs and provided with a handle secured on the rod outside of the bin, a bin for bran having a passage for the flow of bran into the passage leading from the bin for grain, a slide for regulating the flow of bran from the bin for bran, and a slide in the passage leading from the bin for grain below the passage leading from the bin for bran to regulate the flow of grain and bran into the eating trough, substantially as described.

In testimony whereof I have signed my name to this specification in the presence of two subscribing witnesses.

AUGUST R. HOFFMANN.

Witnesses:
HARRIET M. HETFIELD,
MARY BIERMAN.